(12) United States Patent
Chu

(10) Patent No.: US 10,116,168 B2
(45) Date of Patent: Oct. 30, 2018

(54) WIRELESS POWER TRANSMITTER DEVICE AND WIRELESS POWER RECEIVER DEVICE

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 492 days.

(21) Appl. No.: 14/849,612

(22) Filed: Sep. 10, 2015

(65) Prior Publication Data

US 2016/0072309 A1 Mar. 10, 2016

Related U.S. Application Data

(60) Provisional application No. 62/048,282, filed on Sep. 10, 2014.

(51) Int. Cl.
*H02J 50/12* (2016.01)

(52) U.S. Cl.
CPC .................................. *H02J 50/12* (2016.02)

(58) Field of Classification Search
None
See application file for complete search history.

(56) References Cited

U.S. PATENT DOCUMENTS

| 2012/0235506 A1* | 9/2012 | Kallal et al. ............ | H02J 5/005 307/104 |
| 2012/0293118 A1* | 11/2012 | Kim et al. ............... | H02J 5/005 320/108 |
| 2015/0115727 A1* | 4/2015 | Carobolante ........... | H02J 5/005 307/104 |
| 2015/0162785 A1* | 6/2015 | Lee ......................... | H02J 17/00 307/104 |

OTHER PUBLICATIONS

Andre Kurs, Aristeidis Karalis, Robert Moffatt, J. D. Joannopoulos, Peter Fisher, Marin Soljacic, "Wireless Power Transfer via Strongly Coupled Magnetic Resonances", Science, vol. 317, No. 5834, pp. 83-86, Jul. 6, 2007.

(Continued)

*Primary Examiner* — Thienvu Tran
*Assistant Examiner* — David M Stables
(74) *Attorney, Agent, or Firm* — CKC & Partners Co., Ltd.

(57) ABSTRACT

A wireless power transmitter device that includes a transmitter circuit, a transmitter coil, a transmitter communication unit and a transmitter control unit is provided. The transmitter circuit generates a transmitting current. The transmitter coil receives the transmitting current to generate an electromagnetic field to induce a receiving current in a wireless power receiver device. The transmitter communication unit is configured to receive a report of a received power of the wireless power receiver device therefrom. The transmitter control unit receives the report of the received power and determines whether a frequency splitting phenomena occurs according to the received power. When the frequency splitting phenomena occurs, the transmitter control unit adjusts at least one of a configuration of the transmitter coil and a configuration of the transmitter circuit or adjusts a transmitting frequency of the transmitting current.

18 Claims, 5 Drawing Sheets

(56) References Cited

OTHER PUBLICATIONS

Xueliang Huang, Linlin Tan, Wei Wang, YaLong Zhou, Hao Qiang, "Resonant Frequency Splitting Analysis and Optimation of Wireless Power Transfer System," PIERS Proceedings, pp. 684-688, Moscow Russia, Aug. 19-23, 2012.

Lan Jianyu, Tang Houjun, Gen Xin, "Frequency Splitting Analysis of Wireless Power Transfer System Based on T-type Transformer Model," Electronics & Electrical Engineering 2013, vol. 19 Issue 10, pp. 109.

Alliance for wireless power, "A4WP Wireless Power Transfer System Baseline System Specification (BSS)," v1.2, Jan. 2014.

Wireless power consortium, "System Description, wireless power transfer," vol. I, part 1, version 1.1.2, Jun. 2013.

\* cited by examiner

WIRELESS POWER TRANSMITTER DEVICE AND WIRELESS POWER RECEIVER DEVICE

RELATED APPLICATIONS

This application claims priority to U.S. Provisional Application Ser. No. 62/048,282, filed Sep. 10, 2014, which is herein incorporated by reference.

BACKGROUND

Field of Invention

The present invention relates to a wireless power transmission technology. More particularly, the present invention relates to a wireless power transmitter device and a wireless power receiver device.

Description of Related Art

It becomes popular to adopt resonant coils to improve wireless power transmission efficiency for wireless charging systems. However, in power electronics, an interesting phenomenon is that two tightly coupling coils cannot stay in resonance simultaneously. For example, when a coil in a power receiver is placed too close to a coil in a power transmitter, the power received by the power receiver decreases significantly because the two coils are not resonating with each other.

Accordingly, what is needed is a wireless power transmitter device and a wireless power receiver device to address the above issues.

SUMMARY

The invention provides a wireless power transmitter device. The wireless power transmitter device includes a transmitter circuit, a transmitter coil, a transmitter communication unit and a transmitter control unit. The transmitter circuit is configured to generate a transmitting current. The transmitter coil is electrically connected to the transmitter circuit, wherein the transmitter coil is configured to receive the transmitting current to generate an electromagnetic field to induce a receiving current in a wireless power receiver device. The transmitter communication unit is configured to receive a report of a received power of the wireless power receiver device therefrom. The transmitter control unit is electrically connected to the transmitter circuit, the transmitter coil, and the transmitter communication unit, wherein the transmitter control unit is configured to receive the report of the received power and determine whether a frequency splitting phenomena occurs according to the received power. When the frequency splitting phenomena occurs, the transmitter control unit adjusts at least one of a configuration of the transmitter coil and a configuration of the transmitter circuit or adjusts a transmitting frequency of the transmitting current.

Yet another aspect of the present invention is to provide a wireless power transmitter device. The wireless power transmitter device includes a transmitter circuit, a transmitter coil, a transmitter communication unit and a transmitter control unit. The transmitter circuit is configured to generate a transmitting current. The transmitter coil is electrically connected to the transmitter circuit, wherein the transmitter coil is configured to receive the transmitting current to generate an electromagnetic field to induce a receiving current in a wireless power receiver device. The transmitter communication unit is configured to receive a report of a received power of the wireless power receiver device therefrom. The transmitter control unit is electrically connected to the transmitter circuit, the transmitter coil, and the transmitter communication unit, wherein the transmitter control unit is configured to receive the report of the received power and generate a power transmitting ratio according to the transmitted power and the received power. The transmitter control unit adjusts at least one of a configuration of the transmitter coil and a configuration of the transmitter circuit or adjusts a transmitting frequency of the transmitting current according to the power transmitting ratio.

Still another aspect of the present invention is to provide a wireless power receiver device. The wireless power receiver device includes a receiver coil, a receiver circuit and a receiver control unit. The receiver coil is configured to generate a receiving current based on an electromagnetic field generated by a wireless power transmitter device. The receiver circuit is electrically connected to the receiver coil, wherein the receiver circuit is configured to receive the receiving current. The receiver control unit is configured to detect a received power generated by the receiver coil to determine whether the received power s lower than a threshold value. When the received power is lower than the threshold value, the receiver control unit adjusts a configuration of the receiver coil until the received power reaches a peak value.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
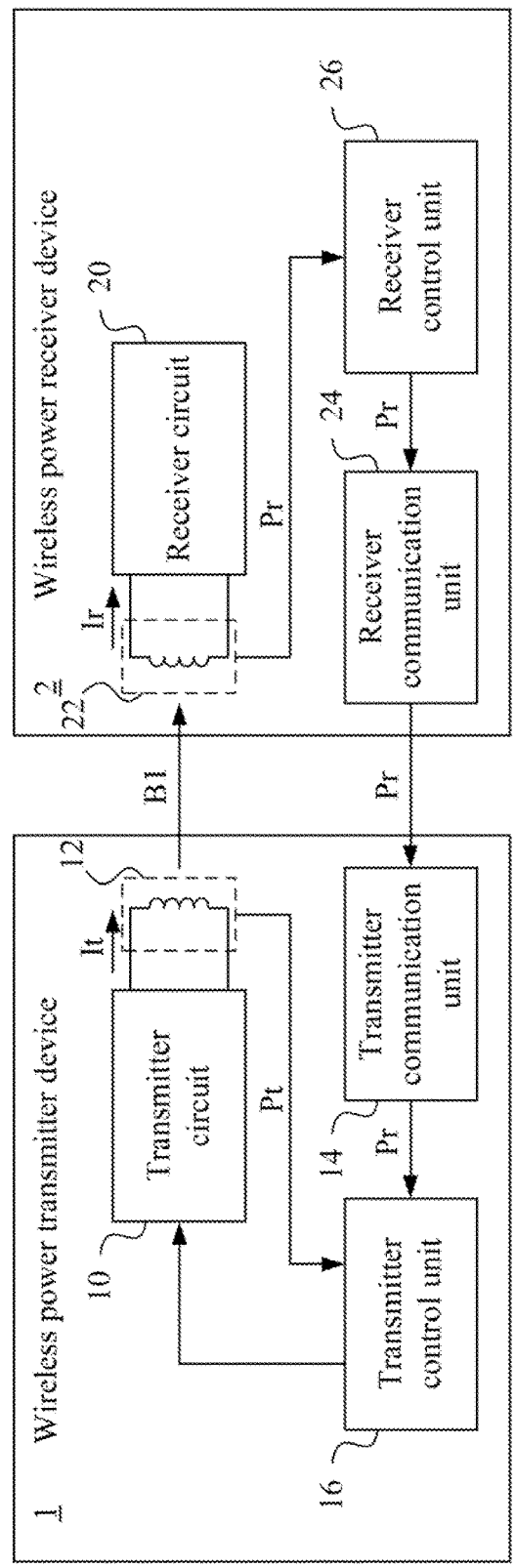
FIG. 1 is a block diagram of a wireless power transmitter device and a wireless power receiver device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of a wireless power transmitter device 1 and a wireless power receiver device 2 in an embodiment of the present invention.

In an embodiment, the wireless power transmitter device 1 includes a transmitter circuit 10, a transmitter coil 12, a transmitter communication unit 14 and a transmitter control unit 16. In different embodiments, the wireless power transmitter device 1 can be implemented by any charging device such as, but not limited to a wireless charging pad.

In an embodiment, the wireless power receiver device 2 includes a receiver circuit 20, a receiver coil 22, a receiver communication unit 24 and a receiver control unit 26. In different embodiments, the wireless power receiver device 2 can be implemented by any device such as, but not limited to a smartphone, a tablet PC, a laptop or a vehicle.

In operation, the transmitter circuit 10 of the wireless power transmitter device 1 is configured to generate a transmitting current It to generate an electromagnetic field B1 by using the transmitter coil 12 of the wireless power transmitter device 1. Moreover, a receiving current Ir is induced in the receiver coil 22 of the wireless power receiver device 2 and the receiver circuit 20 of the wireless power receiver device 2 is configured to receive the receiving current Ir. As a result, a energy storage (not illustrated) in the wireless power receiver device 2 can be charged.

The architecture and the operation of both of the wireless power transmitter device 1 and the wireless power receiver device 2 are explained in detail below with reference to the accompany figures.

Figure 2:
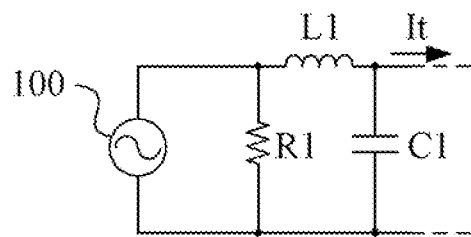
FIG. 2 is an exemplary circuit diagram of the transmitter circuit in FIG. 1 in an embodiment of the present invention.

Reference is now made to FIG. 2. FIG. 2 is an exemplary circuit diagram of the transmitter circuit 10 in FIG. 1 in an embodiment of the present invention. In FIG. 2, the transmitter circuit 10 exemplarily includes a voltage source 100, a resistor R1, an inductor L1 and a capacitor C1.

As illustrated, the resistor R1 and the capacitor C1 are electrically connected in parallel with the voltage source 100, in which the inductor L1 is electrically connected between the resistor R1 and the capacitor C1.

Exemplarily, the transmitting current It is generated at the connection point of the capacitor C1 and the inductor L1. The resistor R1, the inductor L1 and the capacitor C1 together form an oscillating circuit that has a resonant frequency according to the energy from the voltage source 100.

It is appreciated that the configuration of the transmitter circuit 10 is not limited thereto. In other embodiments, other components and configurations can be used in the transmitter circuit 10 to generate the transmitting current It.

The transmitter coil 12 is electrically connected to the transmitter circuit 10 to receive the transmitting current It to generate the electromagnetic field B1 In an embodiment, the receiver coil 22 is physically disposed next to the transmitter coil 12 such that the electromagnetic field B1 passes through the receiver coil 22 to induce a receiving current Ir therein.

In an embodiment, the receiver circuit 20 includes an energy storage such as, but not limited to a battery. As a result, the receiver circuit 20 is configured to receive the receiving current Ir such that the battery therein is charged.

The transmitter communication unit 14 is configured to receive a report of a received power Pr of the wireless power receiver device 2 therefrom. In an embodiment, the receiver control unit 26 is configured to detect the received power Pr according to the receiving current Ir and the voltage (not labeled) in the receiver coil 22 to either retrieve a maximum power value or calculate an average power value. The receiver communication unit 24 is configured to further transmit the report of the received power Pr periodically or by the request of the wireless power transmitter device 1.

The transmitter communication unit 14 is configured to receive the report of the received power Pr. In some embodiments, the transmission of the report of the received power Pr can be independent from the transmission of the power. The communication interface of the transmitter communication unit 14 and the receiver communication unit 24 are therefore implemented by using technologies such as, but not limited to Bluetooth Low Energy (BLE), WiFi, Zigbee, Near Field Communication (NFC), 3GPP Device to Device (D2D) Communication and 3GPP Machine to Machine (M2M) Communication.

In some embodiments, the transmission of the report of the received power Pr can be integrated with the transmission of the power and is substantially performed through the transmitter coil 12 and the receiver coil 22. The communication interface of the transmitter communication unit 14 and the receiver communication unit 24 are therefore implemented by using technologies such as, but not limited to Load Modulation defined in WPC LPWG and MPWG specification.

The transmitter control unit 16 is configured to receive the report of the received power Pr from the transmitter communication unit 14. Moreover, the transmitter control unit 1 is configured to determine whether a frequency splitting phenomena occurs according to the received power Pr.

Figure 3:
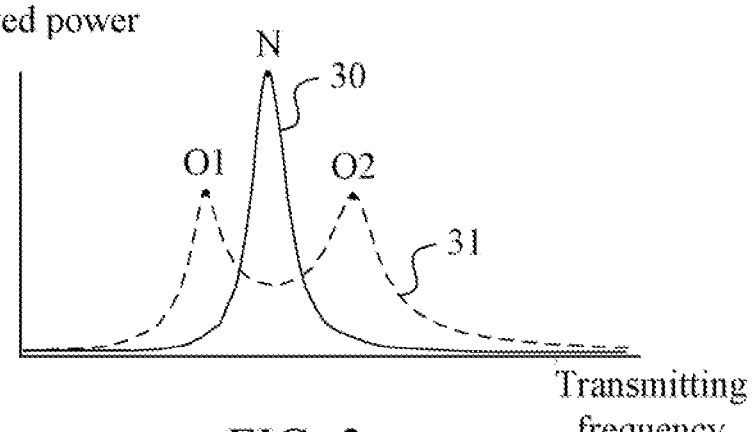
FIG. 3 is a diagram of a waveform of the received power under different transmitting frequencies in an embodiment of the present invention.

Reference is now made to FIG. 3. FIG. 3 is a diagram of a waveform of the received power Pr under different transmitting frequencies in an embodiment of the present invention.

The received power Pr varies according to different transmitting frequencies. In normal condition, the curve of the received power Pr would have only one power peak when the coupling coefficient is small enough, e.g. the power peak N located at the curve 30. The power peak corresponds to the resonant frequency of both of the transmitter circuit 10 and the receiver circuit 20.

Nevertheless, in some conditions, such as when the transmitter circuit 10 and the receiver circuit 20 are physically too close to each other, the coupling coefficient is larger than a threshold such that the curve of the received power Pr has more than one power peak, e.g. the power peaks O1 and O2 located at the curve 31. When there are more than one power peak, the frequency splitting phenomena occurs.

As a result, in an embodiment, the transmitter control unit 16 controls the transmitter circuit 10 to generate a series of transmitting currents It with different transmitting frequencies. The transmitter control unit 16 further receives a series of reports of the received power Pr corresponding to the series of transmitting currents It from the transmitter communication unit 14. The transmitter control unit 16 generates a curve formed by the series of the reports of the received powers Pr, such as, but not limited to the curve 30 or curve 31 illustrated in FIG. 3.

The transmitter control unit 16 determines that the frequency splitting phenomena occurs when there are more than one power peak value on the curve.

When the frequency splitting phenomena occurs, the transmitter control unit 16 adjusts the transmitting frequency of the transmitting current It, or adjusts at least one of a configuration of the transmitter circuit 10 and a configuration of the transmitter coil 12.

These adjustment mechanisms are described in detail below.

In a first example, the transmitter control unit 16 keeps adjusting the transmitting frequency by controlling the voltage source 100 of the transmitter circuit 10 to generate the transmitting current it having different frequency values. In an embodiment, the transmitter control unit 16 adjusts the transmitting frequency until the received power Pr reaches a peak value.

When the frequency splitting phenomena occurs, such a method is used to find a local power peak, such as the power peaks O1 and O2 illustrated in FIG. 3, instead of forcing the frequency splitting phenomena to disappear.

In a second example, the transmitter communication unit 14 receives an information (not illustrated) of a plurality of supported resonant frequencies from the wireless power receiver device 2, such as from the receiver control unit 26 through the receiver communication unit 24. The transmitter control unit 16 further adjusts the configuration of the transmitter circuit 10 based on one of the supported resonant frequencies.

In an embodiment, the transmitter communication unit 14 receives the information of the plurality of supported resonant frequencies periodically from the wireless power receiver device 2. In another embodiment, the transmitter control unit 16 controls the transmitter communication unit 14 to send a request to the wireless power receiver device 2 such that the wireless power receiver device 2 transmits the information of the plurality of supported resonant frequencies in response.

The transmitter control unit 16 further informs the wireless power receiver device 2 to adjust the configuration of the receiver circuit 20 therein based on one of the supported resonant frequencies.

Figure 4:
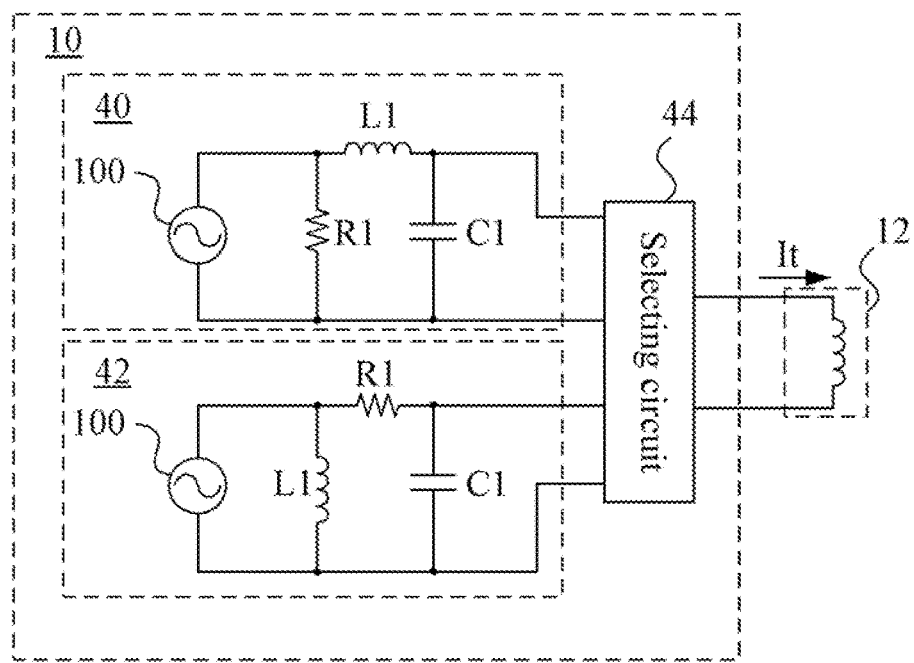
FIG. 4 is a detail block diagram of the transmitter circuit and the transmitter coil in an embodiment of the present invention.

Reference is now made to FIG. 4. FIG. 4 is a detail block diagram of the transmitter circuit 10 and the transmitter coil 12 in an embodiment of the present invention.

In the present embodiment, the transmitter circuit 10 includes two transmitting circuit modules 40 and 42 and a selecting circuit 44. As illustrated in FIG. 4, the two transmitting circuit modules 40 and 42 may be two modules having identical circuit components, e.g. the capacitor C1 the resistor R1 and the inductor L1 with different connection relation. In an embodiment, the two transmitting circuit modules 40 and 42 may be two modules having different circuit components. In yet another embodiment, the two transmitting circuit modules 40 and 42 may be two modules having the same circuit components but with different component values.

The transmitter control unit 16 in FIG. 1 controls the selecting circuit 44 to select at least one of the transmitting circuit modules 40 and 42 to be electrically connected to the transmitter coil 12. The configuration of the transmitter circuit 10 is adjusted accordingly. In an embodiment, the configuration of the receiver circuit 20 can be adjusted by using an identical method to obtain the same resonant frequency as the transmitter circuit 10.

As a result, the resonant frequency of the transmitter circuit 10 and the receiver circuit 20 is adjusted to avoid the occurrence of the frequency splitting phenomena.

It is appreciated that in different embodiments, the number of the transmitting circuit modules is not limited thereto and can be larger than two.

Figure 5:
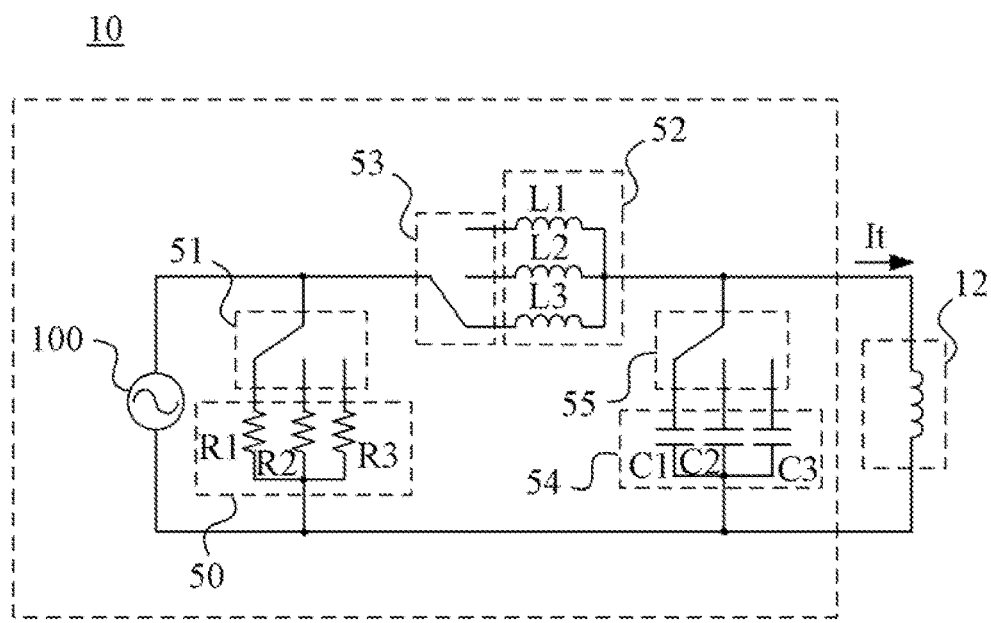
FIG. 5 is a detail block diagram of the transmitter circuit and the transmitter coil in an embodiment of the present invention.

Reference is now made to FIG. 5. FIG. 5 is a detail block diagram of the transmitter circuit 10 and the transmitter coil 12 in an embodiment of the present invention.

In the present embodiment, the transmitter circuit 10 includes three component groups 50, 52 and 54 each including a plurality of circuit components and three selecting circuits 51, 53 and 55.

In FIG. 5, the component group 50 includes resistors R1, R2 and R3 having different resistive values, the component group 52 includes inductors L1, L2 and L3 having different inductive values and the component group 54 includes capacitors C1, C2 and C3 having different capacitive values. The transmitter control unit 16 controls the selecting circuits 51, 53 and 55 to select one of the circuit components in each of the component groups 50, 52 and 54 respectively. In an embodiment, the receiver circuit 20 can be adjusted by using an identical method. Once the component values of the transmitter circuit 10 changes, the coupling coefficient changes as well.

As a result, the coupling coefficient between the transmitter coil 12 and the receiver coil 22 is adjusted to avoid the occurrence of the frequency splitting phenomena.

It is appreciated that in different embodiments, the number of the component groups and the number of the components in each of the component groups are not limited thereto.

In a third example, the transmitter communication unit 14 receives an information (not illustrated) of a configuration of the receiver coil 22 in the wireless power receiver device 2, such as from the receiver control unit 26 through the receiver communication unit 24. The transmitter control unit 16 further adjusts the configuration of the transmitter coil 12 based on the information of the configuration of the receiver coil 22.

Figure 6:
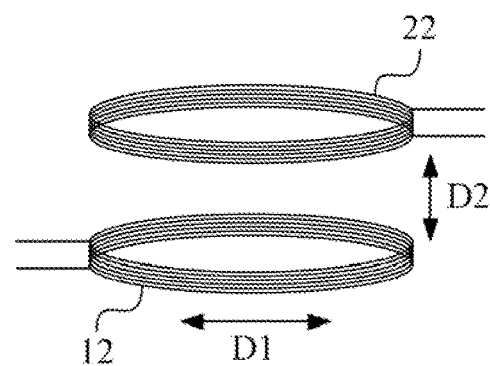
FIG. 6 is a three-dimensional diagram of the transmitter coil and the receiver coil in an embodiment of the present invention.

Reference is now made to FIG. 6. FIG. 6 is a three-dimensional diagram of the transmitter coil 12 and the receiver coil 22 in an embodiment of the present invention.

The transmitter control unit 16 adjusts the configuration of the transmitter coil 12 by adjusting a physically horizontal position of the transmitter coil 12 relative to the receiver coil 22 of the wireless power receiver device 2 and/or a physically vertical position of the transmitter coil 12 relative to the receiver coil 22 of the wireless power receiver device 2 based on the information of the configuration of the receiver coil 22.

In FIG. 6, the physically horizontal position of the transmitter coil 12 relative to the receiver coil 22 is adjusted by moving the transmitter coil 12 along the axis D1, and the physically vertical position of the transmitter coil 12 relative to the receiver coil 22 is adjusted by moving the transmitter coil 12 along the axis D2. Once the area of the receiver coil 22 covered by the electromagnetic field generated by the transmitter coil 12 changes, the coupling coefficient changes as well.

As a result, the coupling coefficient between the transmitter coil 12 and the receiver coil 22 is adjusted to avoid the occurrence of the frequency splitting phenomena.

Figure 7:
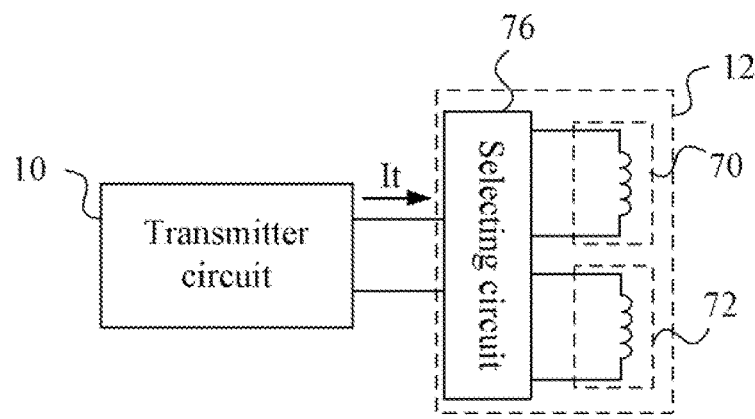
FIG. 7 is a block diagram of the transmitter circuit and the transmitter coil in an embodiment of the present invention.

Reference is now made to FIG. 7. FIG. 7 is a block diagram of the transmitter circuit 10 and the transmitter coil 12 in an embodiment of the present invention.

In FIG. 7, the transmitter coil 12 includes two coil modules 70 and 72 having different sizes (e.g. different sectional area) and a selecting module 74. In another embodiment, the two coil modules 70 and 72 have different coil turns. In yet another embodiment, the size and the coil turns of the two coil modules 70 and 72 are both different. The transmitter control unit 16 adjusts the configuration of the transmitter coil 12 by controlling the selecting circuit 74 to select one of the coil modules 70 and 72 to be electrically connected to the transmitter circuit 10 based on the information of the configuration of the receiver coil 22.

As a result, the coupling coefficient between the transmitter coil 12 and the receiver coil 22 is adjusted to avoid the occurrence of the frequency splitting phenomena.

It is appreciated that in different embodiments, the number of the coil modules is not limited thereto.

Figure 8:
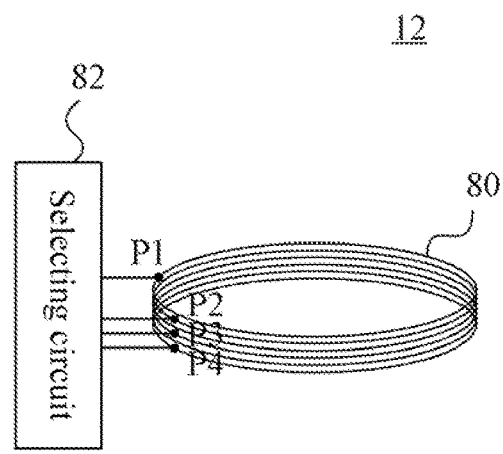
FIG. 8 is a three-dimensional diagram of the transmitter coil in an embodiment of the present invention.

Reference is now made to FIG. 8. FIG. 8 is a three-dimensional diagram of the transmitter coil 12 in an embodiment of the present invention.

The wireless power transmitter device of claim 1, wherein the transmitter coil 12 includes a coil main body 80 having four connection points P1-P4 and a selecting module 82. The transmitter control unit 16 adjusts the configuration of the transmitter oil by controlling the selecting circuit 82 to select two of the connection points P1-P4 of the coil main body 80 to be electrically connected to the transmitter circuit 10 in FIG. 1. The coil turns of the coil main body 80 can be adjusted accordingly.

As a result, the coupling coefficient between the transmitter coil 12 and the receiver coil 22 is adjusted to avoid the occurrence of the frequency splitting phenomena.

In yet another embodiment, the transmitter control unit 16 is further configured to detect a transmitted power Pt generated by the transmitter coil 12 to generate a power transmitting ratio according to the transmitted power Pt and the received power Pr. In an embodiment, the transmitted power Pt is detected based on the transmitting current It and the voltage (not labeled) in the transmitter coil 12 to either retrieve a maximum power value or calculate an average power value.

The transmitter control unit 16 further determines whether frequency splitting phenomena occurs according to the power transmitting ratio. In an embodiment, the transmitter control unit 16 determines that the frequency splitting phenomena occurs when the power transmitting ratio is lower than a threshold value. In an embodiment, the power transmitting ratio is a ratio of the received power Pr and transmitted power Pt. More specifically, the power transmitting ratio can be expressed as Pr/Pt.

When the transmitter control unit 16 determines that the power transmitting ratio is lower than the threshold value, the transmitter control unit 16 adjusts the transmitting frequency of the transmitting current It, or adjusts at least one of a configuration of the transmitter circuit 10 and a configuration of the transmitter coil 12 as illustrated above.

To facilitate the description to follow, an operative example will be described in the paragraphs below with reference to FIG. 9. However, the present disclosure is not limited to the embodiment below.

Figure 9:
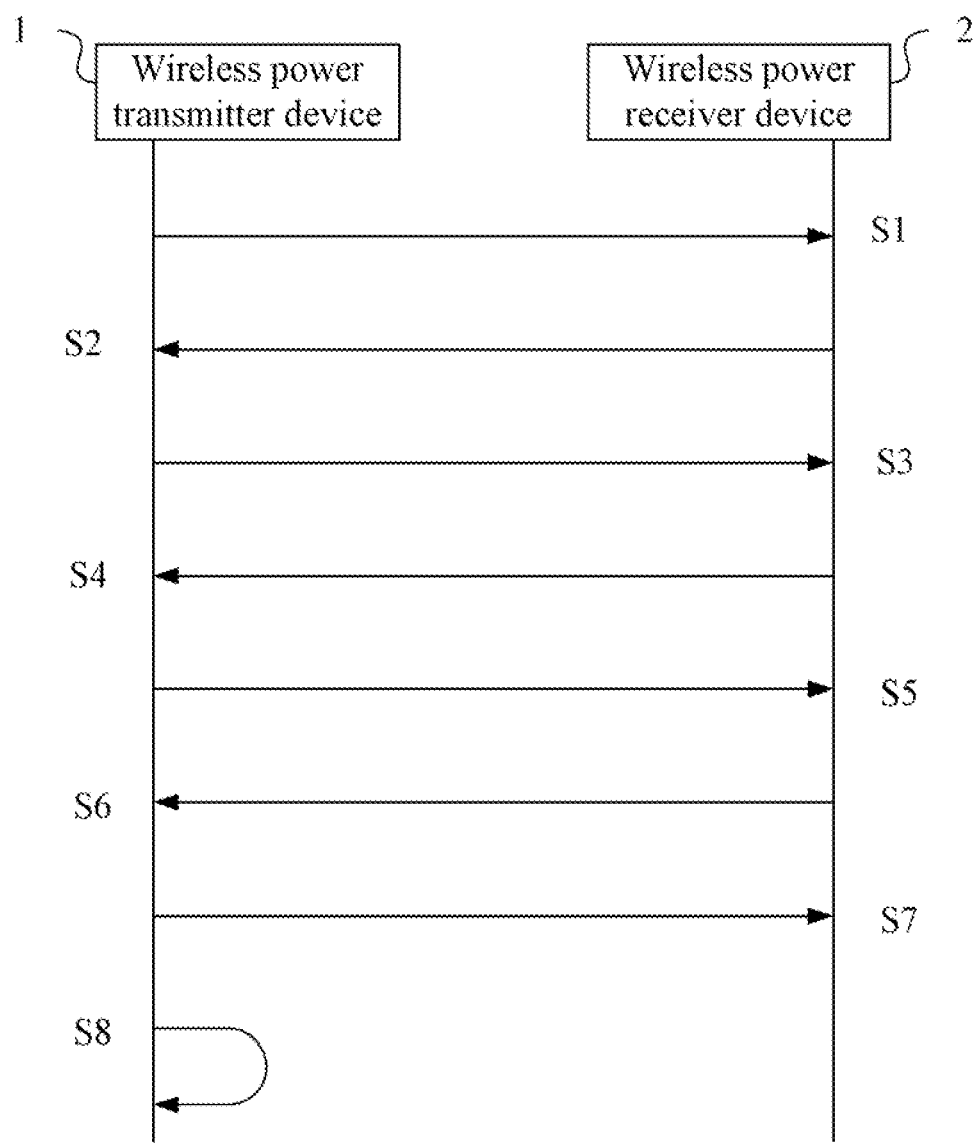
FIG. 9 is an exemplary message flow between the wireless power transmitter device and the wireless power receiver device in an embodiment of the present invention.

Reference is now made to FIG. 9. FIG. 9 is an exemplary message flow 900 between the wireless power transmitter device 1 and the wireless power receiver device 2 in an embodiment of the present invention. In this operative example, the operations in the wireless power transmitter device 1 and the wireless power receiver device 2 are outlined below.

In operation S1, the wireless power transmitter device 1 supplies wireless power to the wireless power receiver device 2. In an embodiment, the transmitter circuit 10 in the wireless power transmitter device 1 generates the transmitting current It to the transmitter coil 12 to induce a receiving current Ir in the wireless power receiver device 2.

In operation S2, the wireless power transmitter device 1 receives the report of the received power Pr of the wireless power receiver device 2 therefrom. In an embodiment, the transmitter communication unit 14 of the wireless power transmitter device 1 receives the report of the received power Pr of the wireless power receiver device 2.

In operation S3, the wireless power transmitter device 1 generates a series of transmitting currents It with different transmitting frequencies.

In operation S4, the wireless power transmitter device 1 receives a series of reports of the received power Pr of the wireless power receiver device 2.

In operation S5, the wireless power transmitter device 1 requests the configuration of the wireless power receiver device 2. In an embodiment, the transmitter control unit 16 requests the configuration of the wireless power receiver device 2 through the transmitter communication unit 14. The configuration of the wireless power receiver device 2 may include the supported resonant frequencies of the receiver circuit 20 and various configurations of the receiver coil 22.

In operation S6, the wireless power transmitter device 1 receives the configuration of the wireless power receiver device 2 therefrom. In an embodiment, the transmitter communication unit 14 of the wireless power transmitter device 1 receives configuration of the wireless power receiver device 2.

In operation S7, the wireless power transmitter device 1 informs the wireless power receiver device 2 the resonant frequency to be used. In an embodiment, the transmitter control unit 16 informs the wireless power receiver device 2 the resonant frequency to be used through the transmitter communication unit 14.

In operation S8, the wireless power transmitter device 1 decreases the resonant frequency or adjusts the configuration of the transmitter coil 12. In an embodiment, the transmitter control unit 16 decreases the resonant frequency by adjusting the configuration of the transmitter circuit 10.

Reference is now made to FIG. 1 again. As described above, the receiver coil 22 generates the receiving current Ir based on the electromagnetic field generated by the wireless power transmitter device 1. The receiver circuit 20 electrically connected to the receiver coil 22 receives the receiving current Ir such that an energy storage (not illustrated) therein is charged.

In an embodiment, the receiver control unit 26 detects the received power Pr generated by the receiver coil 22 to determine whether the received power Pr is lower than a threshold value. When the received power Pr is lower than the threshold value, the receiver control unit 26 adjusts the configuration of the receiver coil 22 until the received power Pr reaches a peak value.

In an embodiment, the configuration of the receiver coil 22 includes a physically horizontal position of the receiver coil 22 relative to the wireless power transmitter device 1 and/or a physically vertical position of the receiver coil 22 relative to the wireless power transmitter device 1.

In an embodiment, an intimating mechanism can be implemented in the wireless power receiver device 2, in which the receiver control unit 26 intimates the user by displaying the position of the receiver coil 22 relative to the transmitter coil 12 in a display unit (not illustrated) or by generating intimating voice signal through a amplifier unit (not illustrated) to guide the user to move the wireless power receiver device 2 to a suggested position.

In another embodiment, the receiver coil 22 includes a plurality of coil modules identical to the coil modules 70 and 72 in the transmitter coil 12 illustrated in FIG. 7 having different sizes and/or different coil turns and a selecting module identical to the selecting module 74 in the transmitter coil 12 illustrated in FIG. 7 such that the configuration of the receiver coil 22 can be adjusted by controlling the selecting circuit to select one of the coil modules to be electrically connected to the receiver circuit 20.

In yet another embodiment, the receiver coil 22 includes a plurality of connection points identical to the connection points P1-P4 illustrated in FIG. 8 and a selecting module identical to the selecting module 80 illustrated in FIG. 8 such that the configuration of the receiver coil 22 can be adjusted by controlling the selecting circuit to select two of the connection points to be electrically connected to the receiver circuit 20.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless power transmitter device comprising:
   a transmitter circuit configured to generate a transmitting current;
   a transmitter coil electrically connected to the transmitter circuit, wherein the transmitter coil is configured to receive the transmitting current to generate an electromagnetic field to induce a receiving current in a wireless power receiver device;
   a transmitter communication unit to receive a report of a received power of the wireless power receiver device therefrom; and
   a transmitter control unit electrically connected to the transmitter circuit, the transmitter coil, and the transmitter communication unit, wherein the transmitter control unit is configured to receive the report of the received power from the transmitter communication unit and determine whether a frequency splitting phenomena occurs according to the received power,
   wherein the transmitter circuit comprises a plurality of component groups each comprising a plurality of circuit components having different component values and a plurality of selecting circuits each corresponds to one of the component groups;
   wherein the transmitter control unit adjusts the configuration of the transmitter circuit by controlling the selecting circuits to select one of the circuit components within each of the component groups to be activated in the transmitter circuit,
   wherein when the frequency splitting phenomena occurs, the transmitter control unit adjusts at least one of a configuration of the transmitter coil and a configuration of the transmitter circuit or adjusts a transmitting frequency of the transmitting current.

2. The wireless power transmitter device of claim 1, wherein the transmitter control unit is further configured to detect a transmitted power generated by the transmitter coil and generate a power transmitting ratio according to the transmitted power and the received power; and
   the transmitter control unit determines the frequency splitting phenomena occurs according to the power transmitting ratio.

3. The wireless power transmitter device of claim 2, wherein the power transmitting ratio is a ratio of the received power and the transmitted power; and
   the transmitter control unit determines the frequency splitting phenomena occurs when the power transmitting ratio is lower than a threshold value.

4. The wireless power transmitter device of claim 1, wherein the transmitter control unit controls the transmitter circuit to generate a series of transmitting currents with different transmitting frequencies;
   the transmitter control unit receives a series of the reports of the received powers corresponding to the series of transmitting currents from the transmitter communication unit;
   the transmitter control unit generates a curve formed by the series of the reports of the received powers; and
   the transmitter control unit determines that the frequency splitting phenomena occurs when there are more than one peak value on the curve.

5. The wireless power transmitter device of claim 1, wherein the transmitter communication unit receives an information of a plurality of supported resonant frequencies from the wireless power receiver device such that the transmitter control unit adjusts the configuration of the transmitter circuit based on one of the supported resonant frequencies and informs the wireless power receiver device to adjust a configuration of a receiver circuit therein based on the one of the supported resonant frequencies when the frequency splitting phenomena occurs.

6. The wireless power transmitter device of claim 5, wherein the transmitter communication unit receives the information of the plurality of supported resonant frequencies either periodically from the wireless power receiver device or after the transmitter control unit controls the transmitter communication unit to send a request to the wireless power receiver device.

7. The wireless power transmitter device of claim 1, wherein the transmitter circuit comprises a plurality of transmitting circuit modules and a selecting circuit such that the transmitter control unit adjusts the configuration of the transmitter circuit by controlling the selecting circuit to select at least one of the transmitting circuit modules to be electrically connected to the transmitter coil.

8. The wireless power transmitter device of claim 1, wherein the circuit components comprise a resistor, a capacitor, an inductor or a combination of the above.

9. The wireless power transmitter device of claim 1, wherein the transmitter communication unit receives an information of a configuration of a receiver coil in the wireless power receiver device from the wireless power receiver device such that the transmitter control unit adjusts the configuration of the transmitter coil based on the information of the configuration of the receiver coil.

10. The wireless power transmitter device of claim 1, wherein the transmitter control unit adjusts the configuration of the transmitter coil by adjusting a physically horizontal position of the transmitter coil relative to the wireless power receiver device and/or a physically vertical position of the transmitter coil relative to the wireless power receiver device.

11. The wireless power transmitter device of claim 1, wherein the transmitter coil comprises a plurality of coil modules having different sizes and a selecting module, the transmitter control unit adjusts the configuration of the transmitter coil by controlling the selecting circuit to select one of the coil modules to be electrically connected to the transmitter circuit.

12. The wireless power transmitter device of claim 1, wherein the transmitter coil comprises a plurality of coil modules having different coil turns and a selecting module, the transmitter control unit adjusts the configuration of the transmitter coil by controlling the selecting circuit to select one of the coil modules to be electrically connected to the transmitter circuit.

13. The wireless power transmitter device of claim 1, wherein the transmitter coil comprises a coil main body having a plurality of connection points and a selecting module, the transmitter control unit adjusts the configuration of the transmitter coil by controlling the selecting circuit to select two of the connection points of the coil main body to be electrically connected to the transmitter circuit.

14. A wireless power transmitter device comprising:
a transmitter circuit configured to generate a transmitting current;
a transmitter coil electrically connected to the transmitter circuit, wherein the transmitter coil is configured to receive the transmitting current to generate an electromagnetic field to induce a receiving current in a wireless power receiver device;
a transmitter communication unit to receive a report of a received power of the wireless power receiver device therefrom; and
a transmitter control unit electrically connected to the transmitter circuit, the transmitter coil, and the transmitter communication unit, wherein the transmitter control unit is configured to receive the report of the received power from the transmitter communication unit and generate a power transmitting ratio according to the transmitted power and the received power,
wherein the transmitter circuit comprises a plurality of component group s each comprising a plurality of circuit components having different component values and a plurality of selecting circuits each corresponds to one of the component groups;
wherein the transmitter control unit adjusts the configuration of the transmitter circuit by controlling the selecting circuits to select one of the circuit components within each of the component groups to be activated in the transmitter circuit;
wherein the transmitter control unit adjusts at least one of a configuration of the transmitter coil and a configuration of the transmitter circuit or adjusts a transmitting frequency of the transmitting current according to the power transmitting ratio; and wherein the transmitter communication unit receives an information of a plurality of supported resonant frequencies from the wireless power receiver device such that the transmitter control unit adjusts the configuration of the transmitter circuit based on one of the supported resonant frequencies and informs the wireless power receiver device to adjust a configuration of a receiver circuit therein based on the one of the supported resonant frequencies according to the power transmitting ratio.

15. The wireless power transmitter device of claim 14, wherein the power transmitting ratio is a ratio of the received power and the transmitted power; and
the transmitter control unit adjusts the at least one of a configuration of the transmitter coil and the configuration of the transmitter circuit or adjusts the transmitting frequency of the transmitting current when the power transmitting ratio is lower than a threshold value.

16. The wireless power transmitter device of claim 14, wherein the circuit components comprise a resistor, a capacitor, an inductor or a combination of the above.

17. A wireless power receiver device comprising:
a receiver coil configured to generate a receiving current based on an electromagnetic field generated by a wireless power transmitter device;
a receiver circuit electrically connected to the receiver coil, wherein the receiver circuit is configured to receive the receiving current; and
a receiver control unit configured to detect a received power generated by the receiver coil to determine whether the received power is lower than a threshold value,
wherein the receiver coil comprises only a coil main body having a plurality of connection points and a selecting module, the receiver control unit adjusts the configuration of the receiver coil by controlling the selecting circuit to select two of the connection points of the coil main body to be electrically connected to the receiver circuit, and
wherein when the received power is lower than the threshold value, the receiver control unit adjusts a configuration of the receiver coil until the received power reaches a peak value.

18. The wireless power receiver device of claim 17, wherein the receiver control unit adjusts the configuration of the receiver coil by adjusting a physically horizontal position of the receiver coil relative to the wireless power transmitter device and/or a physically vertical position of the receiver coil relative to the wireless power transmitter device.

* * * * *